US008280450B2

(12) United States Patent
Suzuki et al.

(10) Patent No.: US 8,280,450 B2
(45) Date of Patent: Oct. 2, 2012

(54) HANDS-FREE PHONE-CALL DEVICE AND TONE QUALITY CONTROL DEVICE

(75) Inventors: Seiichi Suzuki, Tokyo (JP); Kenji Yamauchi, Tokyo (JP); Takashi Harada, Tokyo (JP); Shoichi Akutsu, Tokyo (JP); Hideyuki Aizawa, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 580 days.

(21) Appl. No.: 12/310,485

(22) PCT Filed: Aug. 27, 2007

(86) PCT No.: PCT/JP2007/066522
§ 371 (c)(1),
(2), (4) Date: Feb. 26, 2009

(87) PCT Pub. No.: WO2008/026529
PCT Pub. Date: Mar. 6, 2008

(65) Prior Publication Data
US 2010/0004034 A1 Jan. 7, 2010

(30) Foreign Application Priority Data
Aug. 31, 2006 (JP) .................................. 2006-234908

(51) Int. Cl.
*H04M 1/00* (2006.01)
(52) U.S. Cl. .................. 455/569.1; 455/569.2; 455/570; 455/550.1; 379/391; 379/392.01; 379/390.03
(58) Field of Classification Search ............... 455/569.1, 455/569.2, 570, 550.1; 379/391, 392.01, 379/390.03
See application file for complete search history.

(56) References Cited

U.S. PATENT DOCUMENTS
5,748,725 A * 5/1998 Kubo ........................ 379/392.01
(Continued)

FOREIGN PATENT DOCUMENTS
| JP | A-05-14475 | 1/1993 |
| JP | A-07-312639 | 11/1995 |
| JP | A-09-289474 | 11/1997 |

(Continued)

OTHER PUBLICATIONS
International Search Report of the International Searching Authority mailed on Oct. 23, 2007 for the corresponding International patent application No. PCT/JP2007/066522.

(Continued)

*Primary Examiner* — Ajit Patel
*Assistant Examiner* — Khai M Nguyen
(74) *Attorney, Agent, or Firm* — Posz Law Group, PLC

(57) ABSTRACT

Constant phone-call quality is kept irrespective of setting of a tone adjusting function of a cellular phone under connection. There is provided a sound collector for collecting voices and converting the voices to a voice signal, a communication unit for communicating with a cellular phone terminal according to a predetermined communication protocol, and a reproducing unit for reproducing the voice signal received in the communication unit. A hands-free phone-call device for enabling the cellular phone terminal to execute hands-free phone call is provided with a signal processor for subjecting a voice signal to signal processing of adjusting tone quality to a predetermined state, and a controller for obtaining information on a tone adjusting function from the cellular phone terminal when the cellular phone terminal having the tone adjusting function for adjusting the tone quality during phone call is connected to communicate, and transmitting a predetermined command when it is determined that the tone adjusting function of the cellular phone terminal can be stopped or not, whereby the tone adjusting function of the cellular phone terminal is stopped and then the signal processor is made to execute the signal processing.

9 Claims, 4 Drawing Sheets

U.S. PATENT DOCUMENTS

| | | | |
|---|---|---|---|
| 6,097,971 | A | 8/2000 | Hosoi |
| 6,711,259 | B1 * | 3/2004 | Haimi-Cohen et al. ...... 379/391 |
| 7,684,773 | B2 * | 3/2010 | Kim .......................... 455/183.2 |
| 2005/0069161 | A1 | 3/2005 | Kaltenbach et al. |

FOREIGN PATENT DOCUMENTS

| | | |
|---|---|---|
| JP | A-10-209951 | 8/1998 |
| JP | A-10-276261 | 10/1998 |
| JP | A-2002-51142 | 2/2002 |
| JP | A-2004-128751 | 4/2004 |
| JP | A-2006-270474 | 10/2006 |

OTHER PUBLICATIONS

International Preliminary Report on Patentability and Written Opinion of the International Searching Authority mailed on Mar. 12, 2009 for the corresponding International patent application No. PCT/JP2007/066522.

Extended European Search Report dated Nov. 29, 2011 in corresponding EP Application No. 07792999.0.

* cited by examiner

FIG. 3

| MACHINE TYPE | PRESENCE OR ABSENCES OF TONE ADJUSTING FUNCTION | INFORMATION AS TO WHETHER STOP IS POSSIBLE OR NOT | PARAMETER INFORMATION |
|---|---|---|---|
| AA-1 | PRESENCE | POSSIBLE | P1 |
| AA-2 | PRESENCE | POSSIBLE | P2 |
| ... | ... | ... | ... |
| BB-1 | PRESENCE | IMPOSSIBLE | P3 |
| BB-2 | NO | — | P4 |
| ... | ... | ... | ... |
| MACHINE TYPE IS UNCLEAR (THERE IS STOP POSSIBLE OR IMPOSSIBLE INFORMATION) | PRESENCE | POSSIBLE | P01 |
| MACHINE TYPE IS UNCLEAR (THERE IS STOP POSSIBLE OR IMPOSSIBLE INFORMATION) | PRESENCE | IMPOSSIBLE/UNCLEAR | P02 |
| MACHINE TYPE IS UNCLEAR (THERE IS NO STOP POSSIBLE OR IMPOSSIBLE INFORMATION) | NO/UNCLEAR | — | P03 |

HANDS-FREE PHONE-CALL DEVICE AND TONE QUALITY CONTROL DEVICE

CROSS REFERENCE TO RELATED APPLICATIONS

This application is a U.S national stage application of PCT/JP2007/066522 filed on Aug. 27, 2007, and claims priority to, and incorporates by reference, Japanese Patent Application No. 2006-234908 filed on Aug. 31, 2006.

Technical Field

The present invention relates to a hands-free phone-call device which enables a cellular phone device to execute phone call in a hands-free style, and a tone quality control device used to adjust tone quality under hands-free phone call.

Background Art

There has been know a hands-free phone-call device which enables a user to make a so-called hands-free phone call by using a cellular phone without gripping the cellular phone in a vehicle such as a car or the like. This type of hands-free phone-call device executes short-range radio communications according to Bluetooth (registered trademark) protocol or the like with a cellular phone to transmit/receive speech signals, whereby a driver or a passenger can make a phone call through a cellular phone in a hands-free style (for example, see Patent Document 1). In this type of hands-free phone-call device, when a stationary microphone or speaker is used in place of a head-set type microphone or speaker, an effect caused by noises such as echo or acoustic feedback occurring when amplified voices output from the speaker enters the microphone, engine noise during traveling of a vehicle, etc. is increased. Therefore, in order to enhance the phone-call quality, some of these hands-free phone-call devices are provided with an echo canceller function or a function of adjusting tone quality during phone call such as a noise reduction function or the like.
Patent Document 1: JP-A-10-276261

DISCLOSURE OF THE INVENTION

Problem to be Solved by the Invention

Some types of cellular phones which are connected to hands-free phone-call device for communication are also provided with a tone adjusting function such as the echo canceller function, the noise reduction function or the like. It is dependent on the type of a cellular phone, user's setting or the like whether these functions are stopped or not when the cellular phone is connected to a hands-free phone-call device.

Furthermore, parameter values used to remove echo or noise is adjusted in accordance with the type of a vehicle in which the hands-free phone-call device is mounted, the type of a cellular phone, etc. so that the phone-call quality during phone call is optimized. However, the tone adjusting function may be stopped or operated in accordance with the type of the cellular phone, user's setting or the like, and thus the phone-call quality under the hands-free phone call is varied in accordance with the type of the cellular phone to which the hands-free phone-call device is connected or the like.

An object of the present invention is to provide a hands-free phone-call device that can keep fixed phone-call quality irrespective of the setting of a tone adjusting function of a cellular phone under connection, and a tone adjusting device used to adjust the tone quality during hands-free phone call.

Means of Solving the Problem

A hands-free phone call device according to the present invention that has a sound collecting unit for collecting voices and converting the voices to a voice signal, a communication unit for transmitting the voice signal to a cellular phone terminal and receiving a voice signal from the cellular phone terminal according to a predetermined communication protocol, and a reproducing unit for reproducing the voice signal received in the communication unit and enables the cellular phone terminal to execute hands-free phone call, is characterized by comprising: a signal processor for subjecting the voice signal converted in the sound collecting unit or the voice signal reproduced in the reproducing unit to signal processing to adjust tone quality to a predetermined state; and a controller for obtaining information on a tone adjusting function for adjusting tone quality during phone call from the cellular phone terminal when the cellular phone terminal having the tone adjusting function is connected to communicate through the communication unit, transmitting a predetermined command to the cellular phone terminal when it is determined that the tone adjusting function of the cellular phone terminal can be stopped, thereby stopping the tone adjusting function of the cellular phone terminal, and making the signal processor execute the signal processing.

In this construction, in the hands-free phone-call device in which the voice signal is transmitted/received to/from the cellular phone terminal through the communication unit according to the predetermined protocol, thereby enabling the cellular phone terminal to execute hands-free phone call, when the information on the tone adjusting function in the cellular phone terminal is obtained from the connected cellular phone terminal and the tone adjusting function of the cellular phone terminal can be stopped, the tone adjusting function of the cellular phone terminal side is stopped and then the signal processing of adjusting the tone quality to a predetermined state is executed on the voice signal converted in the sound collector or the voice signal reproduced in the reproducing unit in the signal processor of the hands-free phone-call device, so that the fixed phone-call quality can be kept irrespective of the setting of the tone adjusting function of the cellular phone terminal under connection.

In the above construction, the hands-free phone-call device may further comprises a storage unit storing a parameter setting table in which a parameter value used to execute the signal processing in the signal processor is associated every machine type of the cellular phone terminal in advance, wherein the information on the tone adjusting function contains information on the machine type of the cellular phone terminal, and the controller refers to the parameter setting table to set a parameter value used to execute the signal processing in the signal processor to a value which is associated with the machine type of the cellular phone terminal in advance.

In the above construction, the hands-free phone-call device may further comprises a storage unit for storing a standard value of the parameter used when the signal processing is executed on a voice signal by the signal processor, wherein the controller makes the signal processor execute the signal processing on the voice signal by using the standard value when a cellular phone terminal whose machine type is not contained in the parameter setting table is connected.

In the above construction, the signal processor may subject a voice signal to signal processing of removing an echo component contained in the voice signal collected by the sound collector.

In the above construction, the signal processor may execute signal processing of reducing a noise component contained in a voice signal collected in the sound collector or a voice signal reproduced in the reproducing unit.

In the above construction, the hands-free phone-call device may be an in-vehicle mount type hands-free phone-call device mounted in a vehicle.

A tone adjusting device according to the present invention is characterized by comprising: a communication unit for transmitting a collected voice signal to a cellular phone terminal and receiving a voice signal from the cellular phone terminal according to a predetermined communication protocol; a signal processor for subjecting the collected voice signal or the voice signal received from the cellular phone terminal to signal processing for adjusting tone quality to a predetermined state; and a controller for obtaining information on a tone adjusting function for adjusting tone quality during phone call from the cellular phone terminal when the cellular phone terminal having the tone adjusting function is connected to communicate through the communication unit, transmitting a predetermined command to the cellular phone terminal when it is determined that the tone adjusting function of the cellular phone terminal can be stopped, thereby stopping the tone adjusting function of the cellular phone terminal, and making the signal processor execute the signal processing.

EFFECT OF THE INVENTION

According to the present invention, when the information on the tone adjusting function of the connected cellular phone terminal through the communication unit is obtained and the tone adjusting function of the cellular phone terminal can be stopped, the tone adjusting function of the cellular phone terminal side is stopped, and then the signal processing of adjusting the tone quality to a predetermined state is executed on the voice signal converted in the sound collector or the voice signal reproduced in the reproducing unit in the signal processor of the hands-free phone-call device, so that the fixed communication quality can be kept irrespective of the tone adjusting function of the cellular phone under connection.

BRIEF DESCRIPTION OF THE DRAWINGS

[FIG. 3] is a diagram showing the construction of a parameter setting table.

Figure 1:
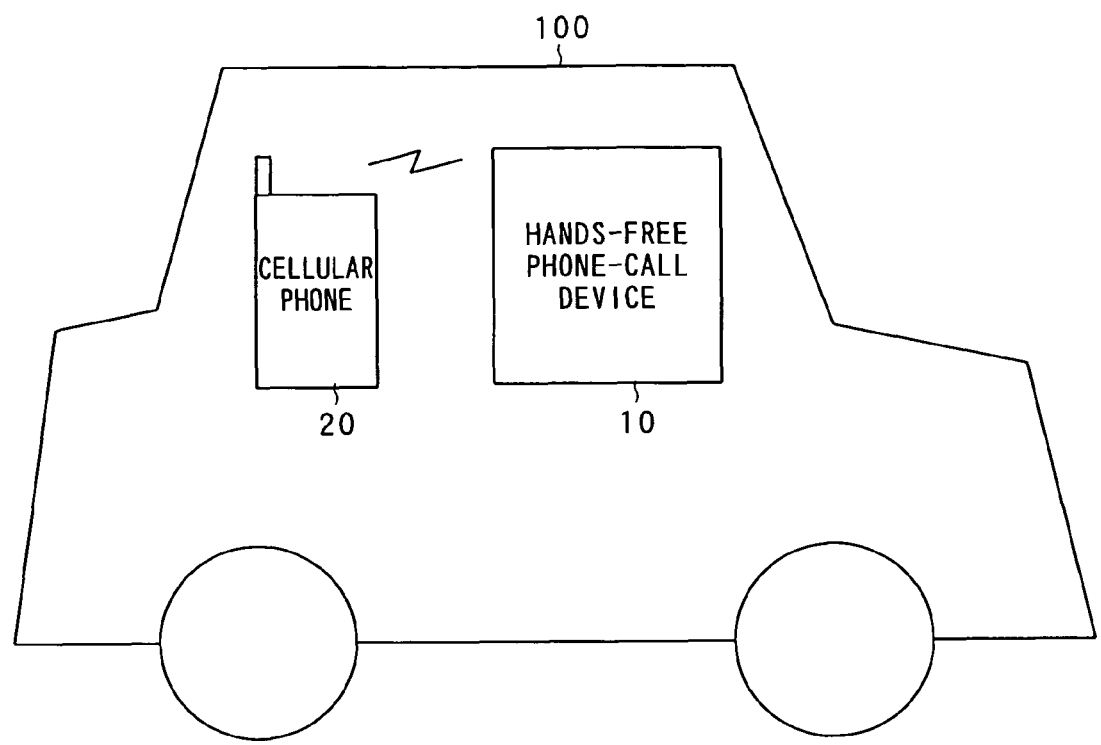
[FIG. 1] is a diagram showing a using style of a hands-free phone-call device according to the present invention.

DESCRIPTION OF REFERENCE NUMERALS 10 hands-free phone-call device
11 sound collector
12 short-range radio communication unit (communication unit)
13 reproducing unit
14 signal processor
15 storage unit
15a parameter setting table storage area
16 controller
20 cellular phone (cellular phone terminal)
30 parameter setting table
100 vehicle Best Mode For Carrying Out The Invention An embodiment of the present invention will be described hereunder with reference to the drawings.

As shown in FIG. 1, a hands-free phone-call device 10 according to a first embodiment of the present invention is designed as an in-vehicle mount device which is mounted in a vehicle 100 such as a car or the like, and it communicates with one or plural cellular phones 20 owned by a driver driving the vehicle 100 or a passenger according to a predetermined communication protocol, thereby enabling the cellular phones 20 to execute hands-free phone call.

voice signals can be transmitted/received in a radio communication style between the hands-free phone-call device 10 and the cellular phone 20 (cellular phone terminal) by using Bluetooth (registered trademark) which is one of short range radio communications. Wireless LAN may be used as the short range radio communication. However, this embodiment is not limited to the radio communication, but may be applied to wire communication. In this embodiment, the description will be made on the assumption that the radio communication is executed.

Figure 2:
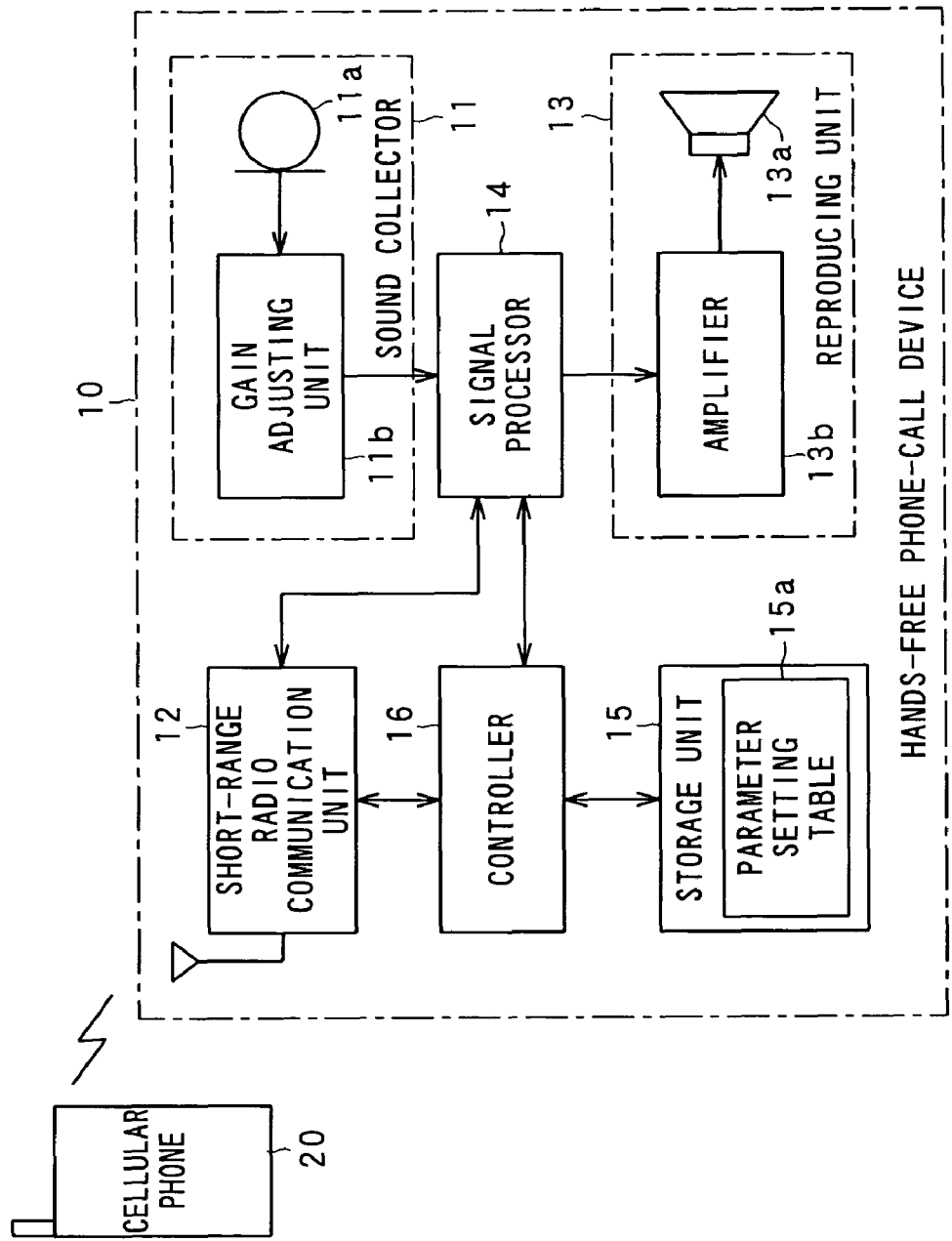
[FIG. 2] is a block diagram showing a functional construction of the hands-free phone-call device.

FIG. 2 is a block diagram showing the functional construction of the hands-free phone-call device 10 together with the cellular phone 20. The cellular phone 20 receives or transmits a portable terminal carrier through a mobile communication network (not shown) and makes a phone call with another portable terminal or land phone. The cellular phone 20 has constituent elements owned by a general cellular phone 20 such as a built-in speaker, a built-in microphone, a communication unit for telephone communication, a communication terminal for voice communication and data communication, and also has a communication module for executing short range radio communication (for example, Bluetooth module) (not shown) according to the predetermined protocol described above with a hands-free phone-call device 10.

On the other hand, as shown in FIG. 2, the hands-free phone-call device 10 has a sound collector 11, a short range radio communication unit 12 (communication unit), a reproducing unit 13, a signal processor 14, a storage unit 15 and a controller 16.

The sound collector 11 has a stationary microphone 11a disposed in the vehicle 100, and a gain adjusting circuit 11b disposed in the hands-free phone-call device 10. The microphone 11a is a non-directive compact microphone, and it converts a voice uttered from a speaker (driver, passenger or the like) to an analog voice signal, and outputs the analog voice signal to the gain adjusting circuit 11b.

The gain adjusting circuit 11b is a signal amplifying circuit, and amplifies the voice signal output from the microphone 11a. The gain adjusting circuit 11b amplifies the voice signal output from the microphone 11a according to a microphone gain value set by the controller 16.

The short-range radio communication unit 12 executes short-range radio communication with the cellular phone 20 in the vehicle 100 according to a predetermined communication protocol under the control of the controller 16. The short-range radio communication unit 12 receives a call-incoming trigger signal transmitted when the cellular phone 20 has an incoming call, outputs the call-incoming trigger signal to the controller 16, receives call-reception voices (voice signal)

transmitted from the cellular phone 20 and outputs the call-reception voices to the reproducing unit 13. In addition, the short-range radio communication unit 12 receives call-transmission voices (voice signal) from the sound collector 11 and transmits the call-transmission voices to the cellular phone 20. For example, when the predetermined communication protocol is based on the Bluetooth protocol described above, the short-range radio communication unit 12 can be constructed by using a Bluetooth module.

The short-range radio communication unit 12 registers (radio-communication connection) the cellular phone 20 as a communication partner according to the above predetermined protocol, and thus it also transmits/receives various kinds of registration signals and registration data. The short-range radio communication unit 12 obtains information on the tone adjusting function of the cellular phone 20 from the cellular phone 20 as the communication partner according to the above predetermined communication protocol. The information on the tone adjusting function contains information on the machine type of the cellular phone 20, information on the presence or absence of the tone adjusting function of adjusting the tone quality under phone call such as an echo canceller function, a noise reduction function, etc. by the cellular phone 20 as the communication partner, and information as to whether the tone adjusting function can be stopped or not. Here, the information as to whether the tone adjusting function can be stopped or not means information as to whether the tone adjusting function of the cellular phone 20 connected to the hands-free phone-call device 10 for communication can be stopped by transmitting a predetermined control command from the hands-free phone-call device 10.

When the hands-free phone-call device 10 and the cellular phone 20 can be connected to each other through a wire, the hands-free phone-call device 10 may be provided with a communication I/F (interface) to which a communication cable is connected, and designed so as to transmit/receive call-reception voices, call-transmission voices and various kinds of control commands through the communication I/F to/from the cellular phone 20.

The reproducing unit 13 has a speaker 13a disposed in the vehicle 100, and an amplifier 13b disposed in the hands-free phone-call device 10. The reproducing unit 13 reproduces the voice signal received from the cellular phone 20 through the short-range radio communication unit 12 while amplifying the voice signal concerned by predetermined sound volume in the amplifier 13b to reproduce the voice signal as a call-reception voice under the control of the controller 16, and outputs a reproduced voice from the speaker 13a to the inside of the vehicle 100. When a car audio device or the like is mounted in the vehicle 100, voices may be output through an audio amplifier or a speaker of the car audio device.

Under the control of the controller 16, the signal processor 14 executes the signal processing of adjusting the tone quality to a predetermined state on the voice signal converted in the sound collector 11 or the voice signal to be reproduced in the reproducing unit 13. Specifically, the signal processor 14 has a so-called echo canceller device or a noise reduction device, and it subjects the voice signal on the signal processing of remove or reduce an echo component or a noise component which is contained in the voice signal because the voice amplified and reproduced in the reproducing unit 13 is collected by the sound collector 11 or engine noise or the like is collected when the vehicle travels. When the signal processing is executed on the voice signal, the signal processor 14 executes the signal processing on the basis of the parameter values set by the controller 16.

The storage unit 15 stores control programs executed by the controller 16 and various kinds of data, and it is designed to have memory elements such as ROM, RAM, etc. and to be accessible by the controller 16. Furthermore, the storage unit 15 has a parameter setting table storage area 15a in which a parameter setting table 30 for setting the above parameter values is stored. In the parameter setting table 30, machine-type information 31 of the cellular phone 20 is beforehand associated with parameter information 32 such a parameter value, etc. to be set when the cellular phone 20 of the machine type concerned is connected for communication (see FIG. 3).

The parameter setting table 30 is referred to in order to set a parameter value used when the controller 16 makes the signal processor 14 execute the signal processing on the voice signal. The above parameter information 32 is associated with each machine-type information 31 of the cellular phone 20, and also when it is grasped on the basis of the machine type of the cellular phone 20 in advance whether the tone adjusting function is provided or not and also whether the tone adjusting function can be stopped or not, information 33 on the presence or absence of the tone adjusting function and information 34 as to whether the tone adjusting function can be stopped or not are associated with each machine type. As described above, the machine-type information 31 of the cellular phone 20 and the information 33 on the presence or absence of the tone adjusting function and the information 34 on the stop or non-stop of the tone adjusting function are associated with each other together with the parameter information 32 in advance, whereby the information on the machine type of the cellular phone 20 can be treated as the information on the tone adjusting function of the cellular phone 20. Accordingly, by merely obtaining the information on the machine type of the cellular phone 30 from the cellular phone 20 concerned, upon referring to the parameter setting table 30, the controller 16 can judge the presence or absence of the tone adjusting function of the cellular phone 2 and also whether the tone adjusting function can be stopped or not.

The parameter information 32 contains information on respective parameter values such as a filter coefficient of an adaptive filter used to remove the echo component from the voice signal in the signal processor 14, a filter coefficient of an adaptive filter used to remove the noise component, etc., the microphone gain value, etc. These parameter values are preset every machine type of the cellular phone connected for communication so that the phone-call quality is optimum in accordance with the vehicle type of the vehicle 100 in which the hands-free phone-call device 10 is mounted.

At this time, it is different in accordance with the machine type of the cellular phone 20 or the user's setting whether the tone adjusting function such as the echo canceller function, the noise reduction function, etc. exists or the like and whether the toner adjusting function is stopped or not when the cellular phone 20 is connected to the hands-free phone-call device 10 for communication.

Therefore, for example when the cellular phone 20 has the tone adjusting function and also the tone adjusting function of the cellular phone 20 side can be stopped by transmitting a predetermined control command from the hands-free phone-call device 10 to the cellular phone 20 like the machine types of the cellular phone 20 of AA-1, AA-2, such parameter values that the phone-call quality is optimum when the tone adjusting function is stopped in the machine type of the cellular phone 20 are set in the parameter information P1, P2.

Furthermore, for example when the cellular phone 20 has the tone adjusting function and also the hands-free phone-call device 10 cannot stop the tone adjusting function of the cellular phone 20 side like the machine type of the cellular phone 20 of BB-1, such a parameter value that the phone-call quality is optimum under the state that the tone adjusting function of the cellular phone 20 is exercised is set in the parameter information P3.

Furthermore, for example when the cellular phone 20 has no tone adjusting function like the machine type of the cellular phone 20 of BB-2, such a parameter value that the phone-call quality is optimum in the machine type of the cellular phone 20 are set in the parameter information P4.

On the other hand, when the machine type of the cellular phone 20 connected to the hands-free phone-call device 10 for communication is not contained in the parameter setting table 30, that is, it is identified at the hands-free phone-call device 10 side that the machine type of the cellular phone 20 is unclear, a parameter (a standard value of the parameter) is set as a default. Here, three kinds of parameter values are preset as the default parameter value. For example, a parameter standard value used when the machine type is unclear, but it is identified that the cellular phone has the tone adjusting function and the tone adjusting function thereof can be stopped is set in the parameter information OP1. Furthermore, a parameter standard value used when the cellular phone has the tone adjusting function, but it is identified that the tone adjusting function cannot be stopped is set in the parameter information OP2. Furthermore, a parameter standard value used when the machine type is unclear and no tone adjusting function exists or the presence or absence thereof is unclear is set in the parameter information OP3.

It is preferable that the parameter setting table 30 may be designed to be rewritable. When the cellular phone 20 whose machine type is not contained in the parameter setting table 30 is connected for communication, it is preferable that the information on the tone adjusting function containing the information on the machine type of the cellular phone 20 is obtained from the cellular phone 20 concerned, and the machine type information of the cellular phone 20, the information on the presence or absence of the tone adjusting function, the information as to whether the tone adjusting function can be stopped or not, etc. are successively registered in association with one another in the parameter setting table 30. At this time, the parameter information 32 associated with the machine type information 31 may be set to any one of the parameter information PO1 to PO3 which is selected in accordance with the presence or absence of the tone adjusting function of the cellular phone 20 and the information whether the tone adjusting function can be stopped or not. Furthermore, it is preferable that the parameter information 32 which is associated with each machine type information 31 in accordance with the machine type of the cellular phone 20 is rewritable to a parameter value with which a user's favorite tone quality state can be arbitrarily established through tuning or the like through an operating portion (not shown) by the user during phone call. With this construction, the tone quality when the user makes a hands-free call of the cellular phone 20 by using the hands-free phone-call device 10 can be set to a user's favorite tone quality state.

The controller 16 is constructed by CPU or the like, and controls the respective parts according to various kinds of control programs stored in the storage unit 15 so that the cellular phone 20 can perform hands-free phone call. When the controller 16 receives an incoming-call trigger signal from the cellular phone 20 through the short-range radio communication unit 12, the controller 16 transmits various kinds of control commands to the cellular phone 20 through the short-range radio communication unit 12 so that the call-incoming cellular phone 20 is set to the hands-free phone-call state, and prohibits the cellular phone 20 to output voices from the built-in speaker and also input voices from the built-in microphone. In addition, the controller 16 controls the built-in short-range radio communication unit 12 to transmit call-reception voices, and shifts the operation mode of the cellular phone 20 concerned to a hands-free phone-call mode.

When the operation mode of the cellular phone 20 is shifted from the hands-free phone-call mode to an independently-usable normal operation mode, the controller 16 transmits various kinds of control commands through the short-range radio communication unit 12 to the cellular phone 20 to permit the output of voices from the built-in speaker and the input of voices from the built-in microphone.

Furthermore, when the operation mode of the cellular phone 20 is shifted to the hands-free phone-call mode as described above, the controller 16 obtains the information on the machine type of the cellular phone 20 as the information on the tone adjusting function from the cellular phone 20 in this embodiment, and sets the parameter value used to subject the voice signal to the signal processing in the signal processor 14 as follows.

The operation of setting the parameter value as described above will be described with reference to FIG. 4.

Figure 4:
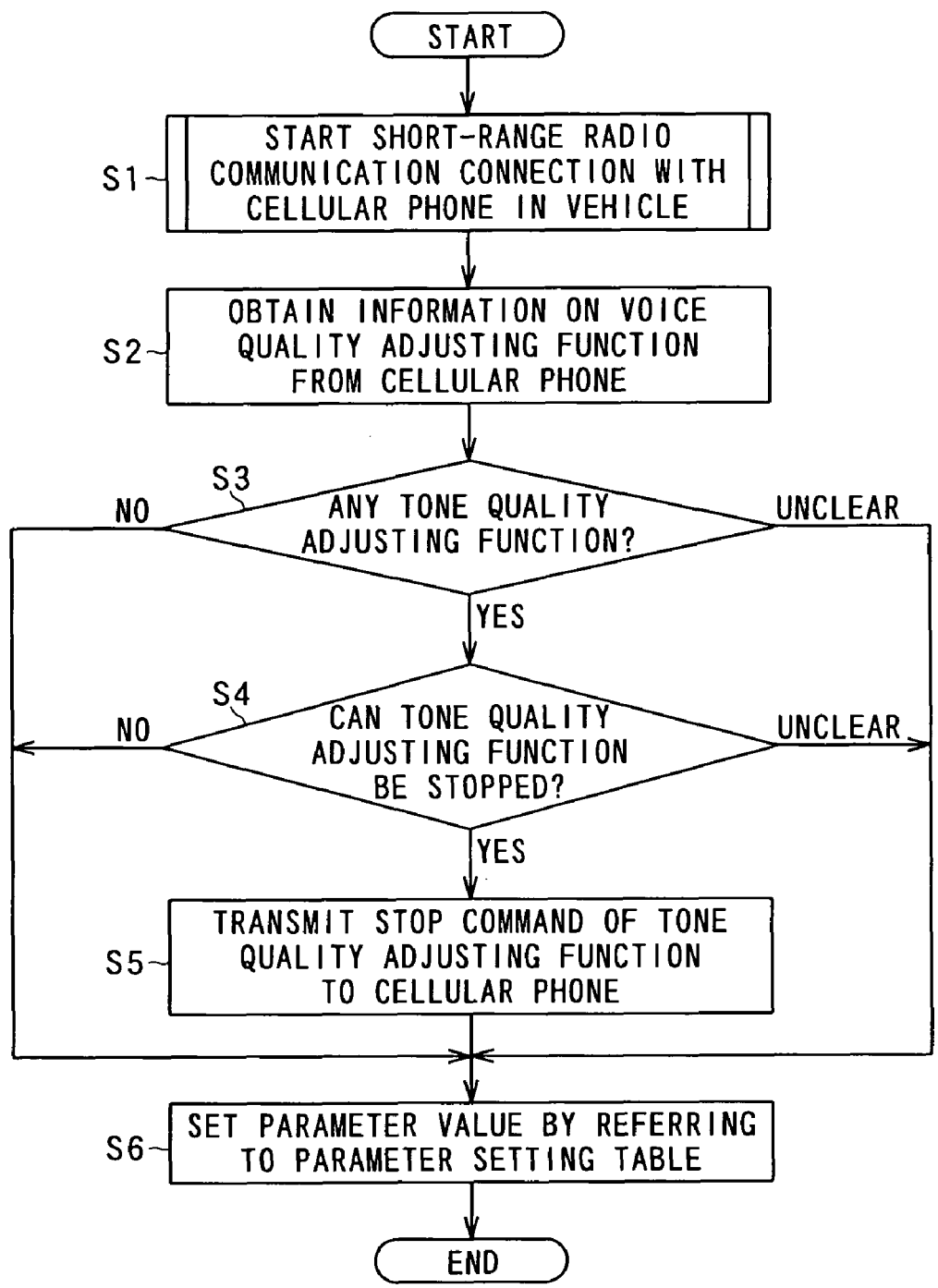
[FIG. 4] is a flowchart showing the operation of the hands-free phone-call device.

As shown in FIG. 4, the controller 16 first starts the radio communication connection according to a predetermined protocol through the cellular phone 20 existing in the vehicle 100 and the short-range radio communication unit 12, and transmits a reply request of the cellular phone 20 to the cellular phone 20 (step S1). The controller 16 establishes synchronous communication with the cellular phone 20 which returns a reply, obtains identification ID such as the information on the machine type of the cellular phone 20, etc. and stores the identification ID into a predetermined storage area of the storage unit 15 (step S2).

Subsequently, the controller 16 determines the presence or absence of the tone adjusting function of the cellular phone 20 currently connected to execute communications on the basis of the information on the machine type obtained from the cellular phone 20 by referring to the parameter setting table 30 (step S3). When the cellular phone 20 has the tone adjusting function (step S3: Y), it is determined whether the tone adjusting function of the cellular phone 20 side can be stopped or not (step S4). When it is determined that the tone adjusting function of the cellular phone 20 side can be stopped (step S4: Y), the controller 16 transmits a predetermined control command for stopping the tone adjusting function to the cellular phone 20 to stop the tone adjusting function of the cellular phone 20 side (step S5).

As described above, when the tone adjusting function of the cellular phone 20 side can be stopped (step S4: Y), the tone adjusting function is stopped (step S5), and then the controller 16 refers to the parameter setting table 30 to read out the parameter information 32 corresponding to the machine type information 31 of the cellular phone which is currently connected to communicate, and sets the parameter value used in the signal processor 14 (step S6).

For example, in the case of the example shown in FIG. 3, when the machine type of the cellular phone 20 which is currently connected to communicate is AA-1 (AA-2), the parameter information P1 (P2) is read out, and the parameter value corresponding to the parameter information P1 is set. Here, when the machine type of the cellular phone 20 which is currently connected to communicate is not contained in the parameter setting table 30, the parameter information OP1 set as the standard value of the parameter when the parameter information PO1 set as the standard value of the parameter when the cellular phone 20 has the tone adjusting function and the tone adjusting function can be stopped is referred to and the parameter value is set.

When the tone adjusting function of the cellular phone 20 side cannot be stopped or it is unclear whether it can be stopped or not (step S4: N/unclear), the controller 16 refers to the parameter setting table 30 to read out the parameter information 32 corresponding to the machine type information 31 of the cellular phone 20, and sets the parameter value used in the signal processor 14 (step S6).

For example, in the case exemplified in FIG. 3, when the machine type of the cellular phone which is currently connected to communicate is BB-1, the parameter information P3 is read out, and the parameter value corresponding to the parameter information P3 is set. Here, when the machine type of the cellular phone 20 which is currently connected to communicate is not contained in the parameter setting table 30, the parameter information PO2 set as the standard value of the parameter when the cellular phone 20 has the tone adjusting function and the tone adjusting function concerned cannot be stopped or it is unclear is referred to and the parameter value is set.

Furthermore, when the cellular phone 20 which is currently connected to communicate has no tone adjusting function or the presence or absence of the tone adjusting function is unclear (step S3: N/unclear), the controller 16 refers to the parameter setting table 30 to read out the parameter information 32 corresponding to the machine type information 31 of the cellular phone 20, and sets the parameter value used in the signal processor 14.

For example, in the case exemplified in FIG. 3, when the machine type of the cellular phone 20 which is currently connected to communicate is BB-2, the corresponding parameter information P4 is read out, and the parameter value corresponding to the parameter information P4 is set. Here, when the machine type of the cellular phone 20 which is currently connected to communicate is not contained in the parameter setting table 30, the parameter information PO3 set as the standard value of the parameter when there is no tone adjusting function or the presence or absence of the tone adjusting function is unclear is read out, and the parameter value corresponding to this parameter information PO3 is set.

As described above, after the controller 16 sets the parameter value used in the signal processor 14, the controller 16 monitors call-in and call request of the cellular phone 20. When the controller 16 detects the call-in or the call request of the cellular phone 20, the control command is transmitted to the cellular phone through the short-range radio communication unit 12 to shift the operation mode of the cellular phone 20 concerned to the hands-free phone-call mode, thereby enabling the hands-free phone call to be started.

According to the hands-free phone-call device 10 of the embodiment described above, in the hands-free phone-call device 10 in which voice signals are transmitted/received to/from the cellular phone 20 through the short-range radio communication unit 12 according to the predetermined communication protocol, whereby the phone call can be performed in the hands-free style, when the information on the tone adjusting function of the connected cellular phone 20 is obtained from the connected cellular phone 20 concerned and the tone adjusting function of the cellular phone 20 can be stopped, the tone adjusting function of the cellular phone 20 side is stopped, and then the signal processing for adjusting the tone quality to a predetermined state is executed on the voice signal converted in the sound collector 11 in the signal processor 14 of the hands-free phone-call device 10 concerned or the voice signal reproduced in the reproducing unit 13, whereby constant phone-call quality can be kept irrespective of the setting of the tone adjusting function of the cellular phone 20 when the cellular phone is connected to the hands-free phone-call device 10.

That is, when the cellular phone 20 having the tone adjusting function is connected, the tone adjusting function is stopped or not stopped in accordance with the machine type of the cellular phone 20 or user's setting, whereby the tone quality during phone call can be prevented from varying, and the phone-call quality under the hands-free phone call can be kept to a fixed level irrespective of the machine type of the cellular phone 20 and the user's setting.

Furthermore, according to this embodiment, in the parameter setting table 30, the information 33 on the presence or absence of the tone adjusting function and the information 34 as to whether the tone adjusting function can be stopped or not are stored in association with each other in the machine type information 31 of the cellular phone 20, and by merely obtaining the information on the machine type of the cellular phone 20 as the information on the tone adjusting function from the cellular phone 20, the controller 16 can obtain the information 33 on the presence or absence of the tone adjusting function of the cellular phone 20 side and the information 34 as to whether the tone adjusting function can be stopped or not. The parameter value which optimizes the tone quality during phone call is preset every machine type of the cellular phone 20 in accordance with the presence or absence of the tone adjusting function and whether the tone adjusting function can be stopped or not. Therefore, the signal processing using this parameter value is executed on the voice signal in the signal processor 14, whereby the echo component and the noise component contained in the voice signal are removed and the tone quality under phone call can be optimized every cellular phone 20.

Furthermore, in this embodiment, when the machine type of the cellular phone 20 which is currently connected to communicate is not contained in the parameter setting table 30, there exist three kinds of parameter information PO1 to PO3 which are set in accordance with the presence or absence of the tone adjusting function and whether the tone adjusting function can be stopped or not. Therefore, even when the machine type information 31 of the cellular phone 20 which is currently connected to communicate is not registered in the parameter setting table of the hands-free phone-call device 10 in advance, the voice signal is subjected to the signal processing by using the standard value of the parameter in the signal processor 14, whereby the phone-call quality during the hands-free phone call can be kept to a fixed level.

Still furthermore, in this embodiment, the parameter setting table 30 is designed to be rewritable, and when the machine type of the cellular phone which is connected to communicate is not contained in the parameter setting table 30, the machine type concerned can be successively registered in the parameter setting table 30. Therefore, when the cellular phone of the same machine type is connected to communicate, by referring to the parameter setting table 30, these information can be obtained at the hands-free phone-call device 10 by merely obtaining the machine type information of the cellular phone 20 without obtaining from the cellular phone 20 any information on the presence or absence of the tone adjusting function and any information as to whether the tone adjusting function can be stopped or not.

The embodiment described above is an example of the present invention, and various modifications may be arbitrarily made without departing from the subject matter of the present invention.

For example, according to the above embodiment, the information on the presence or absence of the tone adjusting function and the information as to whether the tone adjusting function can be stopped or not are stored in association with each other in the parameter setting table 30 every machine type of the cellular phone 20. However, by communicating with the cellular phone 20 according to a predetermined communication protocol, these information may be directly obtained from the cellular phone 20.

In the hands-free phone-call device 10 of the above embodiment, the sound collector 11 and the reproducing unit 13 are provided. However, as described above, when a card audio device or the like is mounted in the vehicle 100 as described above, it is needless to say that a toner adjusting device having substantially the same construction as the short-range radio communication unit 12, the signal processor 14, the storage unit 15 and the controller 16 shown in FIG. 2 may be designed by using an audio amplifier, a speaker, etc. provided to the car audio device and also utilizing an external microphone.

Furthermore, the hands-free phone-call device 10 of the above embodiment has been described to be an in-vehicle mount type mounted in the vehicle 100. The hands-free phone-call device 10 according to this embodiment is not limited to the in-vehicle mount type, and it is needless to say that it is mounted in a room such as a meeting room or the like.

The invention claimed is:

1. A hands-free phone-call device having a sound collecting unit that collects voices and converts the voices to a voice signal, a communication unit that transmits the voice signal to a cellular phone terminal and receives a voice signal from the cellular phone terminal according to a predetermined communication protocol, and a reproducing unit that reproduces the voice signal received in the communication unit and enables the cellular phone terminal to execute hands-free phone call, comprising:

a signal processor that subjects the voice signal converted in the sound collecting unit or the voice signal reproduced in the reproducing unit to signal processing to adjust tone quality to a predetermined state;

a storage unit having a parameter setting table that is used when the signal processing is executed in the signal processor and stores parameter information representing whether a tone adjusting function of adjusting tone quality during phone call is provided or not and whether the tone adjusting function can be stopped or not, the parameter information being stored in association with the machine type of each cellular phone; and a controller that obtains information on the machine type of a cellular phone terminal from the cellular phone terminal when the cellular phone terminal is connected to communicate through the communication unit, refers to the parameter setting table to determine on the basis of the information in the machine type obtained from the cellular phone terminal whether the tone adjusting function of the cellular phone terminal can be stopped or not, transmits a predetermined command to the cellular phone terminal when it is determined that the tone adjusting function of the cellular phone terminal can be stopped, thereby stopping the tone adjusting function of the cellular phone terminal, and makes the signal processor execute the signal processing.

2. The hands-free phone-call device according to claim 1, further comprising a storage unit for storing a standard value of the parameter used when the signal processing is executed on a voice signal by the signal processor, wherein the controller makes the signal processor execute the signal processing on the voice signal by using the standard value when a cellular phone terminal whose machine type is not contained in the parameter setting table is connected.

3. The hands-free phone-call device according to claim 1, wherein the signal processor subjects a voice signal to signal processing of removing an echo component contained in the voice signal collected by the sound collector.

4. The hands-free phone-call device according to claim 3, wherein the signal processor executes signal processing of reducing a noise component contained in a voice signal collected in the sound collector or a voice signal reproduced in the reproducing unit.

5. The hands-free phone-call device according to claim 3, wherein the hands-free phone-call device is an in-vehicle mount type hands-free phone-call device mounted in a vehicle.

6. The hands-free phone-call device according to claim 1, wherein the signal processor executes signal processing of reducing a noise component contained in a voice signal collected in the sound collector or a voice signal reproduced in the reproducing unit.

7. The hands-free phone-call device according to claim 6, wherein the hands-free phone-call device is an in-vehicle mount type hands-free phone-call device mounted in a vehicle.

8. The hands-free phone-call device according to claim 1, wherein the hands-free phone-call device is an in-vehicle mount type hands-free phone-call device mounted in a vehicle.

9. A tone adjusting device comprising:

a communication unit that transmits a collected voice signal to a cellular phone terminal and receives a voice signal from the cellular phone terminal according to a predetermined communication protocol;

a signal processor that subjects the collected voice signal or the voice signal received from the cellular phone terminal to signal processing for adjusting tone quality to a predetermined state;

a storage unit having a parameter setting table that is used when the signal processing is executed in the signal processor and stores parameter information representing whether a tone adjusting function of adjusting tone quality during phone call is provided or not and whether the tone adjusting function can be stopped or not, the parameter information being stored in association with the machine type of each cellular phone; and a controller that obtains information on a the machine type of a cellular phone terminal from the cellular phone terminal when the cellular phone terminal is connected to communicate through the communication unit, refers to the parameter setting table to determine on the basis of the information on the machine type obtained from the cellular phone terminal whether the tone adjusting function of the cellular phone terminal can be stopped or not, transmits a predetermined command to the cellular phone terminal when it is determined that the tone adjusting function of the cellular phone terminal can be stopped, thereby stopping the tone adjusting function of the cellular phone terminal, and makes the signal processor execute the signal processing.

* * * * *